United States Patent [19]

Massot

[11] Patent Number: 4,590,686
[45] Date of Patent: May 27, 1986

[54] DRYING PLANT FOR LIQUID OR PASTY PRODUCTS

[75] Inventor: Jean-Claude Massot, Paris, France

[73] Assignee: Electricite de France Service National, Paris, France

[21] Appl. No.: 598,820

[22] Filed: Apr. 10, 1984

[30] Foreign Application Priority Data

Apr. 14, 1983 [FR] France .................. 83 06109

[51] Int. Cl.$^4$ .............................. F26B 11/06
[52] U.S. Cl. ........................ 34/86; 34/117; 34/120; 34/128
[58] Field of Search ............ 34/86, 117, 120, 128, 34/135, 140, 141, 142

[56] References Cited

U.S. PATENT DOCUMENTS

| | | | |
|---|---|---|---|
| 2,680,084 | 6/1954 | Ryan | 134/35 |
| 3,417,483 | 12/1968 | Willard | 34/117 |
| 3,418,142 | 12/1968 | Willard | 34/117 |
| 3,799,252 | 3/1974 | Soll | 34/120 |
| 4,223,452 | 9/1980 | Chambers | 34/171 |
| 4,393,603 | 7/1983 | Casperson | 34/134 |
| 4,466,202 | 4/1984 | Merten | 34/73 |

FOREIGN PATENT DOCUMENTS

| | | |
|---|---|---|
| 1495665 | 4/1969 | Fed. Rep. of Germany . |
| 3100513 | 8/1982 | Fed. Rep. of Germany . |
| 2466262 | 4/1981 | France . |
| 236754 | 7/1945 | Switzerland . |
| 241756 | 8/1946 | Switzerland . |
| 909889 | 11/1962 | United Kingdom . |
| 1403352 | 8/1975 | United Kingdom . |

*Primary Examiner*—Albert J. Makay
*Assistant Examiner*—David W. Westphal
*Attorney, Agent, or Firm*—Charles E. Brown; Charles A. Brown

[57] ABSTRACT

Drying plant for liquid and paste products is equipped with a drier comprising an outer jacket, a cylinder within the jacket and a space between the jacket and the cylinder constituting a heating chamber. The internal cylinder of the drier is rotatable relative to the jacket around a horizontal axis; the drier comprises means for feeding products to be dried into the cylinder and for spreading these products over the inside wall of said cylinder so as to coat the latter with them, means for separating the dried products from said inside wall, means for evacuating the dried products from inside the cylinder and an outlet for the moisture produced by drying the products.

4 Claims, 6 Drawing Figures

DRYING PLANT FOR LIQUID OR PASTY PRODUCTS

The invention concerns plant for drying liquid and paste products, equipped with a drier comprising an outer jacket, a cylinder within the jacket and a space between the jacket and the cylinder constituting a heating chamber.

Many types of drier for liquid and paste products are already known, in particular driers operating by conduction (cylinder and paddle driers) and by convection (spray towers).

In cylinder driers the products to be dried are spread over the outside surface of a hollow cylinder which is internally heated using vapor and rotates around a horizontal axis. The temperature must be set by the pressure of the vapor in the cylinder and the drying time depends on the rotation speed of the cylinder. The product must be distributed in a fine and uniform layer over the surface of the cylinder and drying is effected progressively as it rotates. The dried product is finally evacuated by means of a scraper blade member which bears on the cylinder along a generatrix.

There exist various versions of this type of drier, derived from the "Hatmaker" drier developed at the beginning of this century, comprising two parallel cylinders disposed at a slight distance from one another, with a feed into a "mud-pit" situated between the cylinders; this type of feed offers the advantage of concentrating the product prior to drying, but involves exposing a large quantity of product to high temperature for relatively long periods, as a result of which this equipment is reserved to the treatment of products which are not heat-sensitive or of which the quality is of little importance (effluent, for example).

To adapt this type of drier to heat-sensitive products of moderate concentration and low viscosity, in particular milk, a subsequent provision was to spray the products onto the surface of the cylinders.

In an alternative arrangement, which cannot be adapted to heat-sensitive products, there is a single cylinder over the surface of which the product is distributed by virtue of it dipping into the liquid to be dried.

In versions which can be adapted to heat-sensitive products, the drier cylinder is wetted by means of one or more satellites. Different embodiments are provided for highly concentrated liquid products; thus for oily liquids (concentrated milk, PVC suspension, hydrolized starch), the drier cylinder is wetted by means of auxiliary cylinders disposed in series on the upstream side of the main cylinder, the first of these dipping into the liquid to be dried; for paste products capable of being pumped (soft cheese, metal oxides, colloidal suspensions), the products may be fed into the space between two auxiliary cylinders in series on the upstream side of the main cylinder; for amyloid products which can be pumped (starch, cereal flour, vegetable purée), the auxiliary cylinders have been distributed over part of the perimeter of the main cylinder on its upstream side, in parallel with it so to speak, so as to bring about the application of a number of successive thin layers, which provides for improved gelatinization and consequently optimization of the yield of the equipment; for paste products which cannot be pumped (potato purée), the same arrangement has been adopted except with a feed by means of a suspended mud-pit effected only on the upstream side of the first auxiliary cylinder.

These driers are generally massive machines which are over-generally specified in order to conform to legislation on pressurized plant.

To overcome this disadvantage there have been provided driers of the last type mentioned with a double-walled cylinder, the thin outside wall rotating and being designed to receive on its perimeter the products from a single suspended mud-pit, deposited in a thin layer uniformized by auxiliary cylinders, whereas the internal wall is held fixed, a heating fluid in the liquid state being circulated in the reverse direction between the two walls, at a pressure close to atmospheric pressure.

Even so, most of these driers are not well-suited to highly heat-sensitive products and, moreover, the latent heat of the moisture is very difficult to recover under good conditions.

In paddle type driers a horizontal cylindrical body heated by a double jacket is provided internally with a rotating shaft fitted with arms at the ends of which are fixed paddles; the shaft and the arms may themselves be heated. The product to be dried is constantly mixed thanks to the orientation of the paddles, and the paddles may in certain cases function as scraper blade members and mixers; however, these driers are incompatible with products which bind or form balls on drying; also, they cannot operate continuously; they are used principally in the pharmaceutical and chemical industries (plastics, metal powders) and relatively little in the agriculture/foodstuffs sector.

Spray towers were designed to overcome the disadvantages of driers operating by conduction, and notably to increase the throughput of the products to be treated and to reduce the degradation caused to heat-sensitive products, especially foodstuff products containing protein, by earlier processes. In these towers the product to be treated is sprayed into an enclosure in which hot air is circulated. However, the intersection of the trajectories of the liquid and the hot air is random, which means that a droplet of product may be either constantly in contact with hot air and so overheated, or else brought into contact only with moist air having already given up its heat; because of this, the product is not dried uniformly; also, it is sometimes necessary to dilute the products before they are fed into the enclosure (by a distribution nozzle). These towers consume large quantities of energy (two kilograms of vapor per kilogram of water removed), and they are large and expensive to install.

An objective of the invention is to overcome these disadvantages and to provide drying plant which is equally suitable for liquid and paste products, compatible with energy-saving systems (involving mechanical recompression of vapor, for example), maintains good quality of processing for heat-sensitive products and can operate continuously.

The invention consists in plant for drying liquid and paste products including a drier comprising an outer jacket, a cylinder within the jacket and a space between the jacket and the cylinder constituting a heating chamber, characterized in that the inner cylinder of the drier is mounted so as to be drivable in rotation about a longitudinal axis relative to the jacket and in that the drier comprises means for feeding products to be dried into the cylinder and for spreading these products over the inside wall of said cylinder so as to coat the latter therewith, means for separating dried products from said inside wall, means for evacuating the dried products from the interior of the cylinder, and an outlet for moisture produced by drying the products.

The invention also concerns drying plant characterized in that it comprises a drier of the above type and a circuit for recovering and compressing the moisture produced by drying the products to be dried, for the purpose of feeding it into said heating chamber.

The characteristics and advantages of the invention will appear from the accompanying drawings, which show preferred embodiments of the invention and in which.

Figure 1:
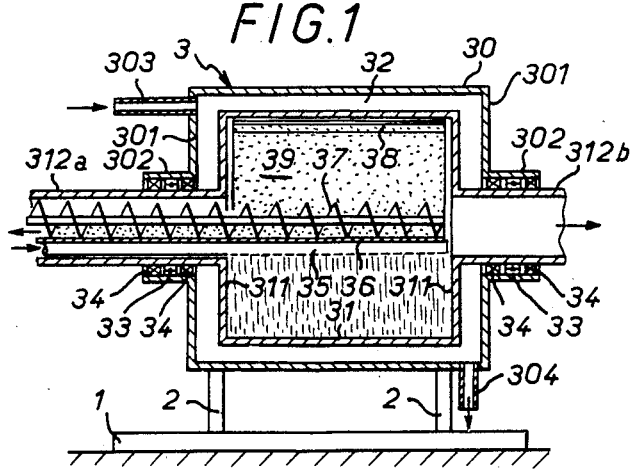
FIG. 1 is a schematic longitudinal cross-section through a first embodiment of a drier for plant in accordance with the invention.

The drier shown in the figures and intended for use in plant in accordance with the invention comprises, on a base 1 on which it is maintained by supports 2, a body 3 consisting of a fixed outer jacket 30 containing a rotating cylinder 31 with a heating chamber 32 between them. The jacket 30 like the rotating cylinder 31 has the general shape of a cylinder of revolution of circular cross-section, the two being disposed coaxially; they thus have a common longitudinal axis, disposed horizontally, and this common longitudinal axis is the central rotation axis of the cylinder 31.

To this end, the jacket 30 comprises end surfaces 301 equipped at their center with bearing housings 302 for supporting the rotating cylinder 31. These bearing housings 302 are designed to accommodate a hollow shaft provided on the cylinder 31 and disposed along the longitudinal axis thereof. This hollow shaft is in two parts each of which communicates with the interior of the cylinder 31, at the center of a respective end surface 311 of said cylinder; the two parts 312 constituting the hollow shaft of the cylinder are supported by the bearing housings 302 through the intermediary of bearings 33, with sealing provided by seals 34.

The fact that the two-part shaft 312 is hollow enables products to be dried to be fed into the cylinder and dried products and moisture to be evacuated from the cylinder, all parallel to the axis of rotation of the cylinder, as will be described in more detail hereinafter.

The space between the jacket 30 and the cylinder 31 is designed to constitute a chamber 32 for the circulation of a heating fluid (vapor, thermal fluid) for heating the cylinder 31 and its contents, more particularly the products to be dried. Thus this space comprises in its upper part, for example in one end of the jacket 30, an inlet 303 for vapor or hot thermal fluid and, in its lower part, for preference in the lateral wall of the jacket 30, approximately opposite the vapor inlet 303, an outlet 304 for the condensates and/or the non-condensed vapors, the cooled thermal fluid, etc.

Figure 2:
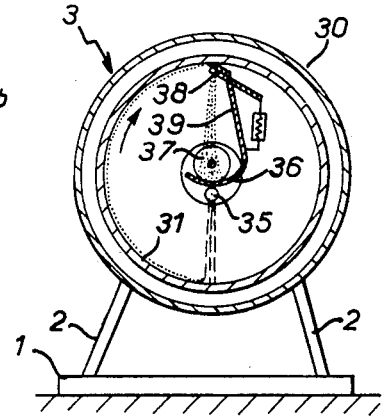
FIG. 2 is a schematic transverse cross-section through the drier of FIG. 1.

In the embodiment shown in FIGS. 1 and 2, the heating fluid which flows through the circulation chamber consists of steam, which may be partially condensed during such circulation. In this embodiment, the products to be dried and the dried products pass through the same side of the cylinder within one of the two hollow half-shafts 312a (respectively entering and exiting the cylinder), whereas the moisture is evacuated through the opposite side in the other hollow half-shaft 312b. To this end, there penetrate into the cylinder 31 through the first hollow half-shaft a feed pipe 35 for the products to be dried, a trough 36 for receiving the dried products, attached for example at its ends to two respective flanges attached to the jacket 30 (this attachment not being shown in order to avoid over-complication of the drawings), beneath which is fixed the feed pipe 35, and an endless screw 37 for extracting the dried products contained in the trough, extending parallel to the axis of the cylinder and functioning as an Archimedes screw; through the second hollow half-shaft the moisture is evacuated by appropriate means, suction means known per se, for example. The pressurized feed pipe 35 passes virtually right through the cylinder 31, and is for example pierced along its length by holes for spraying and spreading the product to be dried over the inside wall of the cylinder so as to coat the latter with them. In order to separate the dried products from this inside wall, a longitudinal blade member 38 extends within the cylinder 31 over virtually its entire length; this blade member is so oriented that its edge is disposed along a generatrix of the cylinder, at a very small distance from the inside wall of the latter, and vertically above the longitudinal axis of the cylinder, for example, the plane of the blade member 38 being inclined at an appropriate angle (of the order of 45° to 90° according to the application) relative to the radius of the cylinder passing through its edge; the blade member is carried by an articulated support connected to the trough 36 by a deflector 39 to which said support is articulated, this deflector preventing dried products separated from the inside wall of the cylinder being projected outside the trough. A spring or a jack connected at one end to the deflector and at the opposite end to the support maintains the blade member in contact with the inside wall of the cylinder; the use of a jack provides a simple means of adjusting the force with which it is so applied.

Thus the drier functions continuously, the internal cylinder 31 being rotated clockwise inside the jacket 30 and heated by the circulation of fluid entering in the steam state via inlet 303 and evacuated in the liquid state via the outlet 304. The products to be dried are fed into the cylinder through the feed pipe 35 and sprayed through the orifices in this pipe, so as to be spread over the inside wall of the cylinder, which causes the products to be dried to coat this wall; when the products to be dried have been spread by gravity over the wall in the lower part of the cylinder the movement of the latter and the drying operation have the result that it is the dried products which reach the upper part of the cylinder; these dried products are separated from the wall by the blade member 38 and fall under gravity into the trough 36 without being dispersed in the cylinder thanks to the presence of the deflector 39 which to some extent guides into the trough particles of the product which would otherwise tend to move away from the normal trajectory. The extractor screw 37, itself rotated within the trough 36, moves the dried products detached from the wall so as to evacuate them from the interior of the cylinder, towards the exterior, through the part constituting the second hollow half-shaft, whereas the moisture produced by drying the products is itself evacuated from the cylinder through the outlet therefor provided in the opposite hollow half-shaft.

Figure 3:
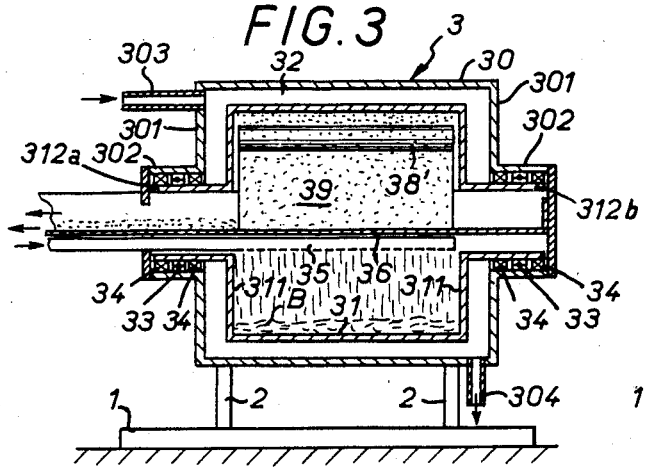
FIG. 3 is a schematic longitudinal cross-section through a second embodiment of a drier for plant in accordance with the invention.
Figure 4:
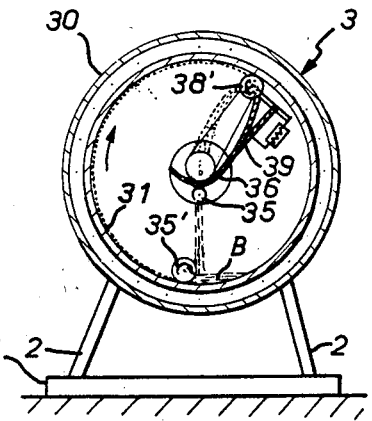
FIG. 4 is a schematic transverse cross-section through the drier of FIG. 3.

In the embodiment shown in FIGS. 3 and 4 the heating fluid is a thermal fluid entering in the gaseous or liquid state, hot, and possibly evacuated in the same state, but at a lower temperature. In this embodiment, not only the products to be dried and the dried products pass through the same end of the cylinder in one of the hollow half-shafts 312a, but also the moisture is evacuated through the same hollow half-shaft. As in the previously described embodiment, through this hollow half-shaft 312a there penetrate into the cylinder a presurized feed pipe 35 which is perforated for spraying purposes, a trough 36 fixed to flanges and under which the pipe 35 is fixed, means for extracting the dried products such as an endless screw (not shown to avoid over-complicating the drawings), and moisture extraction means. Assuming products to be dried of a different consistency than previously, these form in the lower part of the cylinder 31 a mud-pit B which must be manipulated in order to spread the product with relatively regular thickness over the inside wall of the cylinder. To this end the lower part of the drier is fitted with an applicator roller 35' which improves the spreading of the products and the coating of the wall; this applicator roller 35' is disposed longitudinally within the cylinder in such a way that its perimeter is at the required distance from the inside wall of the latter, on the path of the dried products between the lower part of the cylinder into which they fall and the upper part from which, dried, they are detached, for preference in the immediate proximity of the lowest generatrix of the cylinder, given the direction of rotation of said cylinder, but in all cases sufficiently far from the lower part of the cylinder for virtually all of the products to be dried to fall into a region of the wall of the cylinder in which the thickness of the products has not yet been regularized by said roller. In order to separate the dried products from this inside wall, there is provided a cylindrical brush 38' having a longitudinal axis extending over virtually all the length of the cylinder 31 parallel to the longitudinal axis of rotation of the cylinder 31; this brush 38' is arranged so that, on rotation of the cylinder, its perimeter can come into contact with the inside wall of said cylinder. The longitudinal axis of the brush is not in the diametral plane of the cylinder which is disposed vertically, but in an inclined diametral plane so that the products to be dried describe slightly more than a half-rotation on the wall of the cylinder between the time at which they fall under gravity onto this wall and that at which they are separated from this wall by the brush 38'. Like the blade member of FIGS. 1 and 2, the brush 38' is carried by an articulated support connected to the trough 36 by a deflector 39 preventing the dried products being projected outside the trough 36, and a spring or jack also maintains the brush in contact with the inside wall of the cylinder. Two pulleys keyed respectively to the shaft of the brush and to that of the extractor screw and linked by a belt transmit to the brush a rotational movement which brings about detachment of the dried product.

Thus the drier functions in approximately the same way as that of the first embodiment. However, as has already been seen, the heating fluid may leave in the same state as it entered, but at a lower temperature. The products to be dried fall under gravity to the bottom of the cylinder 31 where they form the mud-pit and coating is effected at the start of their upwards trajectory by the applicator roller 35'. When the products, now dried, reach the brush 38', they are detached from the wall of the cylinder by the brush and fall under gravity into the trough 36. They are then evacuated via the first hollow half-shaft. The moisture produced by the drying operation is also evacuated through this hollow half-shaft.

Figure 5:
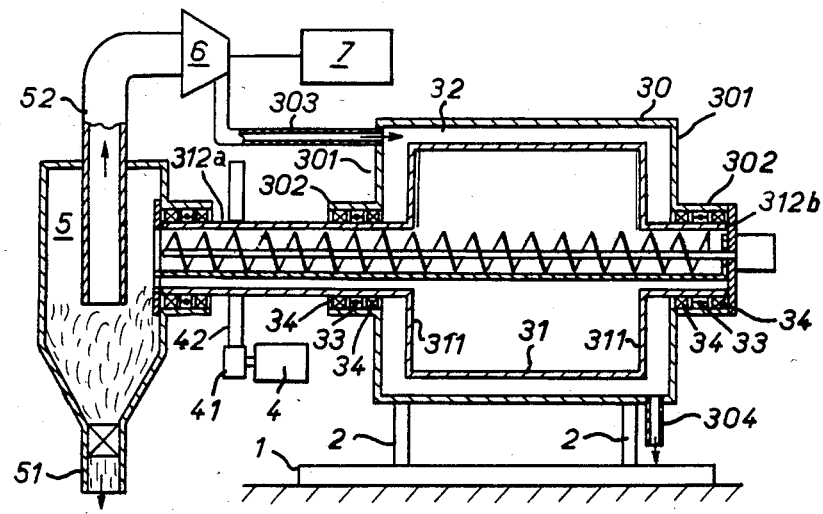
FIG. 5 is a schematic view partially in longitudinal cross-section of plant comprising a drier in accordance with the invention and its principal ancillary units, in the case of a vapor recompression system.

In the embodiment of FIG. 5, as in that of FIGS. 1 and 2, the heating fluid enters the chamber in the vapor state and leaves it in the liquid state; on the other hand, as in the embodiment of FIGS. 3 and 4, the moisture produced by the drying operation is evacuated through the first half-shaft 312a, which is also used to evacuate the dried products; the products to be dried are fed in either through the same side or through the opposite side by means of the second half-shaft (the feeding and spreading means are not shown here). The dried products are separated from the internal wall of the cylinder 31 by a physical device also not shown (such as one of those used in the first and second embodiments), like virtually all of the internal equipment of the drier, which has already been described. The cylinder 31 of the drier 3 is rotated by a motor 4 (preferably a motor-gearbox unit) through the intermediary of pulleys 41 and 42, the pulley 42 being for example keyed to the hollow half-shaft 312a used to feed in the products to be dried and to evacuate the dried products and the moisture; at its end opposite the cylinder 31 this same hollow half-shaft 312a discharges into a cyclone 5 for separating the dried products and the moisture; the dried products are extracted at the base of the cyclone, from where they are taken off by a dried product evacuation conduit 51, whereas the moisture is extracted from the upper part of the cyclone, by a moisture extraction conduit 52 discharging into the inlet of a compressor 6 driven by a motor 7; the outlet from the compressor 6 is connected to the inlet 303 of the heating fluid circulation chamber. Thus it is the moisture extracted from the products to be dried which is recovered and recycled and used to heat the cylinder 31, condensing in the fluid circulation chamber, which thus serves to condense the moisture, which is evacuated through the outlet 304 in the liquid state.

The drier of the plant in accordance with the invention operates at temperatures of approximately 0° to 120° C. on the products side and 0° to 200° C. on the heating side, with a temperature differential between the products and heating sides which may vary from 10° C. to 100° C. approximately. Typically, for a temperature differential of 40° C. between the input temperature of the products to be dried and their temperature at the time of their detachment, an energy input of 120 kWh per tonne of water to be evaporated is required in the case of a mechanical vapor recompression plant.

Figure 6:
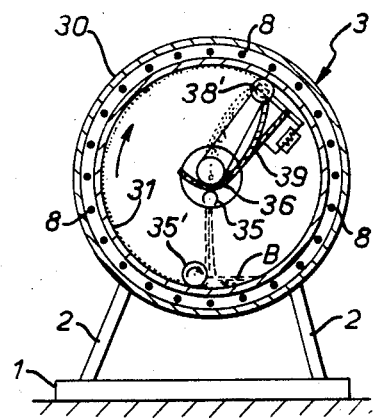
FIG. 6 is a schematic transverse cross-section through another embodiment of drier for drying plant in accordance with the invention.

It will be understood that the invention is not limited to the embodiments as shown and as described hereinabove, and that other embodiments may be proposed without departing from the scope of the invention. For example, in FIG. 6 which shows a drier in other ways similar to that of FIG. 4, the chamber between the jacket and the cylinder might be employed not for the passage of a fluid entering at a relatively high temperature but to accommodate one or more electrical heating elements 8 disposed in a folded or helical configuration.

What is claimed is:

1. A plant for drying liquid or paste products containing a solvent, said plant comprising a dryer including an outer jacket, an inner cylinder within said outer jacket and a space between said outer jacket and said inner cylinder, said space constituting a heating chamber, means for driving in rotation said inner cylinder about a longitudinal axis relative to said outer jacket, said dryer further comprising means for feeding products to be dried into said inner cylinder and for spreading such products over an inside wall of said inner cylinder so as to coat said inside wall, means for removing dried solid products from said inside wall, means for evacuating from said inner cylinder dried solid products and exhaust gas produced in drying the products, means for separating the exhaust gas and the dried solid products, an outlet for the exhaust gas and a circuit for recovering and compressing all of the exhaust gas for feeding it to said heating chamber.

2. A drying plant according to claim 1, characterized in that said heating chamber is adapted to circulate a heating fluid and has a fluid inlet in an upper part thereof and a fluid outlet in a lower part thereof.

3. A drying plant according to claim 1, wherein said heating chamber contains electrical heating means.

4. A plant for drying liquid or paste products containing a solvent; said plant comprising a dryer including an outer jacket, an inner cylinder with said outer jacket, and a space between said outer jacket and said inner cylinder, said space constituting a heating chamber, said heating chamber being adapted to circulate a heating fluid and having a fluid inlet in an upper part thereof and a fluid outlet in a lower part thereof, said heating chamber further having electrical heating means, said dryer further comprising means for driving in rotation said inner cylinder about a longitudinal axis relative to said outer jacket, means for feeding products to be dried into said inner cylinder and for spreading such products over an inside wall of said inner cylinder so as to coat said inside wall, means for removing dried solid products from said inside wall, means for evacuating from said inner cylinder dried solid products and exhaust gas produced in drying such product, means for separarating the exhaust gas and the dried solid products, an outlet for the exhaust gas, and a circuit for recovering and compressing all of the exhaust gas for feeding it to the heating chamber.

* * * * *